(12) United States Patent
Wang et al.

(10) Patent No.: US 11,653,242 B2
(45) Date of Patent: May 16, 2023

(54) VOICE OR MULTIMEDIA SESSION ANALYSIS IN A WIRELESS COMMUNICATION NETWORK

(71) Applicant: Telefonaktiebolaget LM Ericsson (publ), Stockholm (SE)

(72) Inventors: Keven Wang, Sollentuna (SE); Azadeh Bararsani, Solna (SE); Mona Matti, Nacka (SE); Joerg Niemoeller, Sundbyberg (SE); Gábor Stikkel, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 128 days.

(21) Appl. No.: 17/151,755

(22) Filed: Jan. 19, 2021

(65) Prior Publication Data
US 2021/0144575 A1 May 13, 2021

Related U.S. Application Data

(62) Division of application No. 16/091,570, filed as application No. PCT/SE2016/050543 on Jun. 8, 2016, now Pat. No. 10,911,971.

(51) Int. Cl.
*H04W 24/10* (2009.01)
*H04L 43/06* (2022.01)
(Continued)

(52) U.S. Cl.
CPC .............. *H04W 24/10* (2013.01); *H04L 9/40* (2022.05); *H04L 41/0631* (2013.01);
(Continued)

(58) Field of Classification Search
CPC . H04W 24/02; H04W 24/10; H04W 28/0236; H04L 29/06; H04L 41/0631;
(Continued)

(56) References Cited

U.S. PATENT DOCUMENTS

| 5,165,020 A | 11/1992 | Sudama et al. |
| 9,642,044 B2 | 5/2017 | Mutikainen et al. |

(Continued)

FOREIGN PATENT DOCUMENTS

| CN | 101461156 A | 6/2009 |
| CN | 101594646 A | 12/2009 |

(Continued)

*Primary Examiner* — Kan Yuen
(74) *Attorney, Agent, or Firm* — Coats & Bennett, PLLC (57) ABSTRACT

It is presented a method for session analysis in a wireless communication network. The method is performed in a network node of the wireless communication network and comprises receiving a session report from a wireless terminal, the wireless terminal being within a coverage region of the wireless communication network, obtaining a network report associated with the session report, and storing a session network report associated with performance of the obtained network report and performance of the received session report, for the coverage region. It is also presented a network node, a wireless terminal, a computer program and a computer program product thereof.

16 Claims, 6 Drawing Sheets

(51) Int. Cl.
*H04L 43/08* (2022.01)
*H04L 41/0631* (2022.01)
*H04L 9/40* (2022.01)
*H04L 43/16* (2022.01)

(52) U.S. Cl.
CPC .............. *H04L 43/06* (2013.01); *H04L 43/08* (2013.01); *H04L 43/16* (2013.01)

(58) Field of Classification Search
CPC ....... H04L 43/06; H04L 43/062; H04L 43/08; H04L 43/0867; H04L 43/0888; H04L 43/16; H04L 9/40; H04L 29/06455; H04L 45/16; H04L 49/201; H04L 65/4076
See application file for complete search history.

(56) References Cited

U.S. PATENT DOCUMENTS

| | | | |
|---|---|---|---|
| 9,654,954 B2 | 5/2017 | Sedlacek et al. | |
| 2003/0065986 A1* | 4/2003 | Fraenkel | H04L 41/046 714/47.2 |
| 2005/0213509 A1 | 9/2005 | Collomb et al. | |
| 2006/0230154 A1 | 10/2006 | Nguyenphu et al. | |
| 2007/0094380 A1* | 4/2007 | Fu | G06F 16/958 709/224 |
| 2007/0263816 A1 | 11/2007 | Simon Chiu | |
| 2009/0005119 A1* | 1/2009 | Patel | H04W 24/10 455/562.1 |
| 2009/0296682 A1 | 12/2009 | Morise | |
| 2012/0002560 A1* | 1/2012 | Song | H04W 48/20 370/252 |
| 2012/0042036 A1* | 2/2012 | Lau | G06F 8/61 709/217 |
| 2013/0121241 A1* | 5/2013 | Sebire | H04W 48/18 370/328 |
| 2014/0022918 A1 | 1/2014 | Guo et al. | |
| 2014/0161103 A1 | 6/2014 | Sirotkin et al. | |
| 2014/0233448 A1 | 8/2014 | Yun et al. | |
| 2016/0373944 A1* | 12/2016 | Jain | H04W 24/06 |
| 2017/0055197 A1 | 2/2017 | Shukair et al. | |
| 2017/0060654 A1 | 3/2017 | Nandakumar et al. | |
| 2017/0366993 A1* | 12/2017 | Bejerano | H04L 1/003 |
| 2018/0084451 A1 | 3/2018 | Fukuta et al. | |

FOREIGN PATENT DOCUMENTS

| | | |
|---|---|---|
| CN | 102362524 A | 2/2012 |
| CN | 104081741 A | 10/2014 |
| JP | 2007068119 A | 3/2007 |
| WO | 2008131579 A1 | 11/2008 |
| WO | 2011050846 A1 | 5/2011 |
| WO | 2013184383 A2 | 12/2013 |
| WO | 2015183972 A1 | 12/2015 |

\* cited by examiner

VOICE OR MULTIMEDIA SESSION ANALYSIS IN A WIRELESS COMMUNICATION NETWORK

RELATED APPLICATIONS

This application is a divisional of U.S. patent application Ser. No. 16/091,570, which was filed on Oct. 5, 2018, which is a national stage application of PCT/SE2016/050543, which was filed Jun. 8, 2016, the disclosures of each of which are incorporated herein by reference in their entirety.

TECHNICAL FIELD

The invention relates to a method for session analysis in a wireless communication network, and a network node, a wireless terminal, a computer program and a computer program product thereof.

BACKGROUND

When a user wants to make an audio or multimedia call there are today many different choices available on mobile device. Besides traditional circuit switched calls, in 4G operators have started to offer Voice Over LTE (VoLTE), which provides better quality. There further exist quite many Voice Over IP (VoIP) applications like Skype, Viber, WhatsApp. In enterprise domain there are also applications like Lync.

SUMMARY

It is an object of the invention to enable improved performance in an audio or multimedia session in a wireless communication network.

According to a first aspect, it is presented a method for session analysis in a wireless communication network. The method is performed in a network node and comprises receiving a session report from a wireless terminal, the wireless terminal being within a coverage region of the wireless communication network, obtaining a network report associated with the session report, and storing a session network report associated with performance of the obtained network report and performance of the received the session report, for the coverage region.

By the presented method, end users in the same coverage region of a wireless communication network can be provided with assistance for selecting a suitable application or a suitable network for a session.

The method may further comprise evaluating performance of the received session report, and obtaining the network report only when the performance of the received session report is determined to be below a threshold.

The method may further comprise providing performance information associated with the session network report to wireless terminals, via a cell broadcast message, for the coverage region. The method may further comprise obtaining a current network report for the coverage region.

The session report may comprise performance information for an application of the wireless terminal.

The session report may be associated with a call session.

The evaluation of performance may be based on one or more of latency, bandwidth, QoS and firewall action.

The coverage region may be a region associated with one or more of cell, wifi, base station, antenna, geographical area.

The cell broadcast message may comprise a list of applications, and the applications may be listed in a performance order.

The cell broadcast message may comprise a list of type of network, and the types of network may be listed in performance order.

The performance information associated with the session network report may be associated with a time frame.

According to a second aspect, it is presented a method for session analysis in a wireless communication network. The method is performed in a wireless terminal of the wireless communication network and comprises collecting session information associated with an application of the wireless terminal, for a coverage region of the wireless communication network, sending a session report associated with performance of the collected session information to a network node, and receiving performance information associated with a session network report for the coverage region from the network node via a cell broadcast message.

The method may further comprise evaluating performance of the collected session information and providing a session report based on the evaluation.

The evaluation of performance in the wireless terminal may be based on one or more of the following: network quality information, application specific session information, geographical location information, and time information of the session.

According to a third aspect, it is presented a network node for session analysis in a wireless communication network. The network node comprises a processor and a computer program product. The computer program product stores instructions that, when executed by the processor, causes the network node to receive a session report from a wireless terminal, the wireless terminal being within a coverage region of the wireless communication network, to obtain a network report associated with the session report, and to store a session network report associated with performance of the obtained network report and performance of the received the session report, for the coverage region.

According to a fourth aspect, it is presented a wireless terminal for session analysis in a wireless communication network. The wireless terminal comprises a processor and a computer program product. The computer program product stores instructions that, when executed by the processor, causes the wireless terminal to collect session information associated with an application of the wireless terminal, for a coverage region of the wireless communication network, to send a session report associated with performance of the collected session information to a network node, and to receive performance information associated with a session network report for the coverage region from the network node via a cell broadcast message.

According to a fifth aspect, it is presented a network node for session analysis in a wireless communication network. The network node comprises a communication manager. The communication manager is for receiving a session report from a wireless terminal, the wireless terminal being within a coverage region of the wireless communication network, for obtaining a network report associated with the session report, and for storing a session network report associated with performance of the obtained network report and performance of the received the session report, for the coverage region.

According to a sixth aspect, it is presented a wireless terminal for session analysis in a wireless communication network. The wireless terminal comprises a communication manager. The communication manager is for collecting session information associated with an application of the wireless terminal, for a coverage region of the wireless communication network, for sending a session report associated with performance of the collected session information to a network node, and for receiving performance information associated with a session network report for the coverage region from the network node via a cell broadcast message.

According to a seventh aspect, it is presented a computer program for session analysis in a wireless communication network. The computer program comprises computer program code which, when run on a network node in the wireless communication network, causes the network node to receive a session report from a wireless terminal, the wireless terminal being within a coverage region of the wireless communication network, to obtain a network report associated with the session report, and to store a session network report associated with performance of the obtained network report and performance of the received the session report, for the coverage region.

According to an eighth aspect, it is presented a computer program for session analysis in a wireless communication network. The computer program comprises computer program code which, when run on a wireless terminal in the wireless communication network, causes the wireless terminal to collect session information associated with an application of the wireless terminal, for a coverage region of the wireless communication network, to send a session report associated with performance of the collected session information to a network node, and to receive performance information associated with a session network report for the coverage region from the network node via a cell broadcast message.

According to a ninth aspect, it is presented a computer program product comprising a computer program and a computer readable storage means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

It is not obvious for end user which voice or voice over Internet protocol (VoIP) application will be the best choice at different times and locations. Network related user experience, for example if there is network packet loss or delay, the required bandwidth by voice application compared to what the network can actually offer, etc. are difficult for an end user to evaluate. Besides the mentioned static network factors, there may also be a dynamic factor which might not be obvious for end user. Even if network quality for instance is good enough in general, but a certain VoIP application might still not work well due to the fact that is blocked or down prioritized by an enterprise firewall in an office network.

It is thus desirable to be able to provide a suitable voice application list for end user based on information both on user equipment (UE) side and on the network side. Such a list may be specific both in space and in time. Such a list may periodically be pushed to a UE in advance, and there will in such a case be no delay for the end user when selecting a suitable application.

The concept presented herein is a highly scalable with little network overhead, particularly if the list is distributed to UEs by cell broadcast messages. Although, voice applications are generally presented, the same concept may be used also for video applications or other multimedia applications without voice support.

Figure 2:
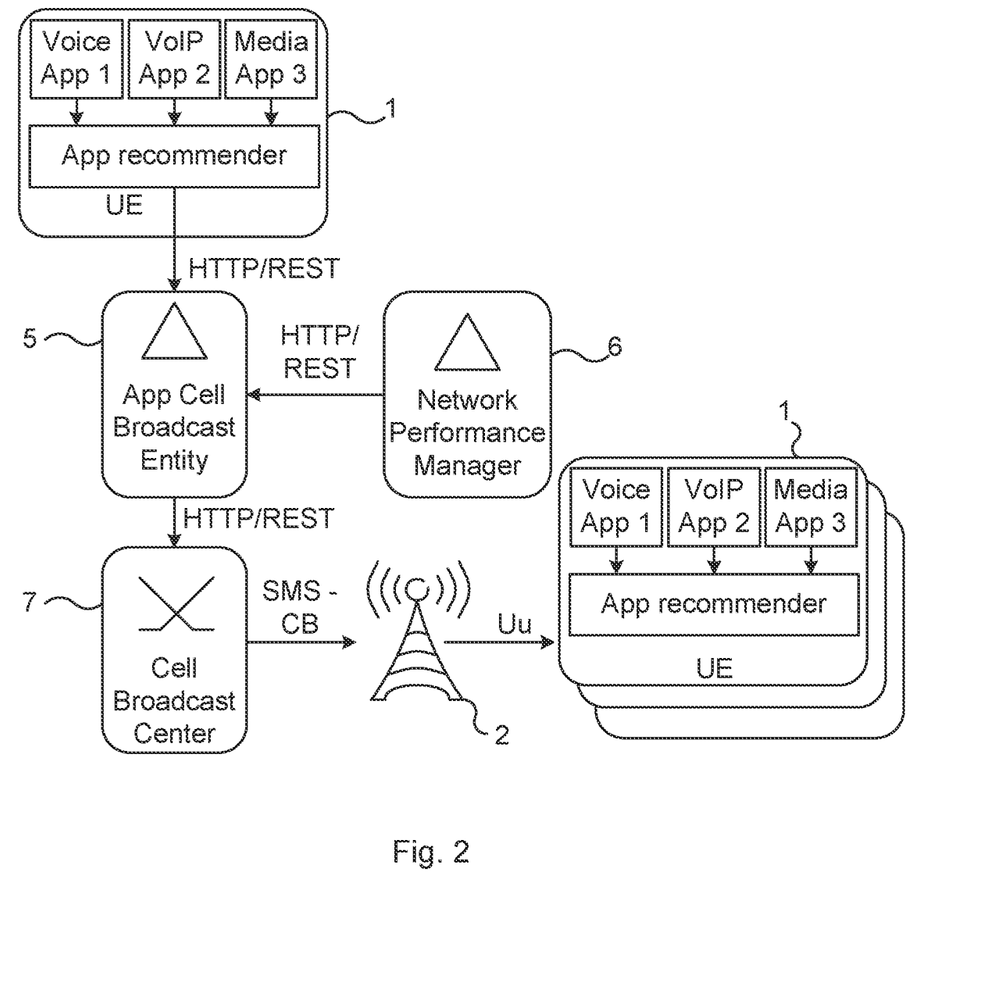
FIG. 2 is a schematic diagram illustrating an embodiment presented herein.

A system overview is presented with reference to FIG. 2.

The UEs 1 illustrated down to the right and the UE 1 illustrated up to the left are in the same coverage region. The UE 1 illustrated up to the left represents a UE previously in the same coverage region that has previously reported call information to the App Cell Broadcast Entity (ACBE) 5. The UEs 1 down to the right are UEs currently in the same coverage region, which receive selection support from the network.

In a UE, besides a number of applications such as voice app 1, VoIP app 2 and Media app 3, a service is running at operating system, here called App Recommender. The role of this service may be to:

Collect session information from an end user when using a voice app. For example, when a user A uses Skype to call one family member, the App Recommender collects a call report from Skype and forwards the report to the ACBE.

Receive a list of applications in a Cell Broadcast message and perform action when end users in the same coverage region use the voice application.

A call report may include the following fields: network type, network name, voice app name, network jitter, network latency, network packet loss, and network bandwidth. A UE with the capacity to analyse session information may send a report with only relevant data. A UE without such a capacity may send a full call report with all session data.

Network type is which type of network is used to make a call. It may e.g. be a Cellular Network or a Wi-Fi Network.

Network name is the name of the network. If it e.g. is Wi-Fi Network, then the Service Set Identifier (SSID) of the Wi-Fi access point is the network name. If it e.g. is Cellar network, it is the operator name and the generation of Cellar network (2G, 3G or 4G) that is the network name.

Voice App Name is the voice application used to make a call. It may e.g. be VoIP applications, or may be one of voice service offered by operator, like Circuit Switched FallBack (CSFB), Simultaneous Voice and Long Term Evolution (SGLTE), and Voice over LTE (VoLTE).

Network Jitter is the network jitter during a call. When connecting to Wi-Fi, e.g. at office, some enterprise firewall may disturb VoIP applications.

Network latency is the network Latency during a call.

Network Packet loss is the packet loss during a call. When e.g. connecting to Wi-Fi at office, some enterprise firewall may disturb VoIP applications, for example drop big packets.

Network Bandwidth is the average, max, min network bandwidth during a call.

The ACBE is acting as Cell Broadcast Entity to generate lists for voice application message to UEs. Based on previous collected call reports from UEs and also real-time/current network quality information from a Network Performance Manager 6, the ACBE provides list on which application performs better in the current network, location and time, and sends the lists in a message to a Cell Broadcast Center (CBC) 7 to be distribute to UEs within a coverage region.

The ACBE can be deployed in the core network 3 or can be a separate node 5 reached by Internet.

The following describes how the ACBE builds such lists based on different data/info sources. In general, there are two phases, post process call report analysis and real-time/current voice app list generation.

Figure 3:
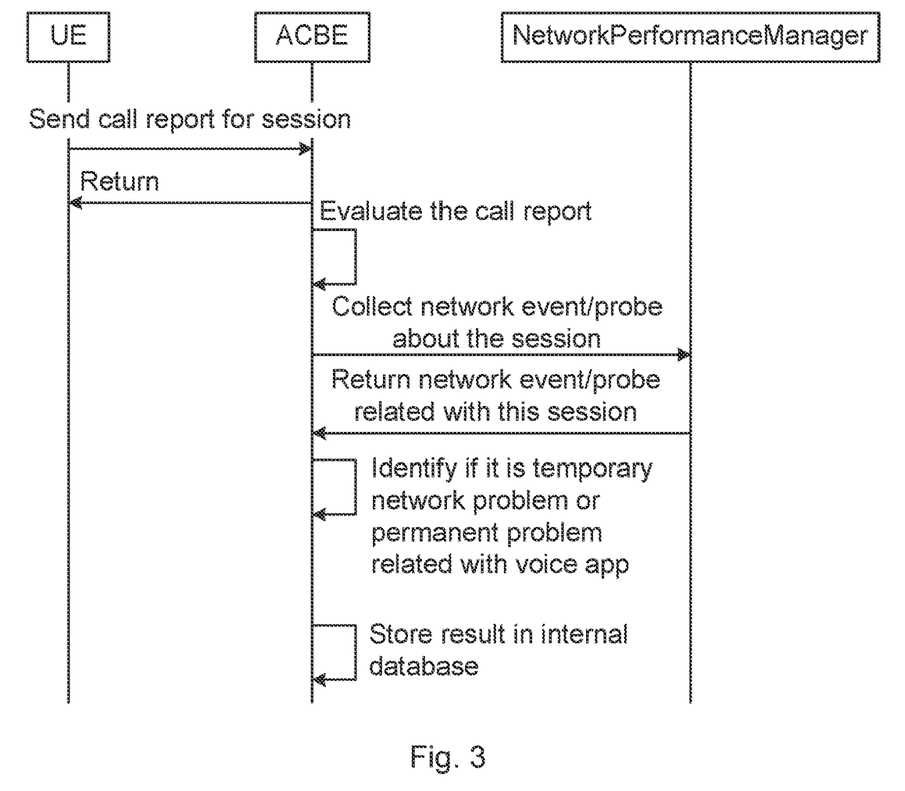
FIG. 3 is a schematic sequence chart illustrating an embodiment presented herein.

The post process call report analysis is illustrated in FIG. 3.

The ACBE continuously receives call reports from UEs who are located in a specific coverage region via Hypertext Transfer Protocol/Representational State Transfer (HTTP/REST) Application Programming Interface (API). The identity of a call associated with a call report is to be used to relate to other information.

For each received call report from a UE, the ACBE evaluates if there is quality issue with the call session associated with the call report.

If there is quality issue, the ACBE also collects corresponding network events, from a network performance manager, related with this call session to identify a potential root cause to the quality issue in this call session. Without a quality issue, the ACBE skips the steps and directly store the result in an internal database.

When the ACBE request a network report, the network performance management sends a report about this call session. The network report may comprise amongst other things quality of service (QoS), and other characteristics related to the voice application used to perform the voice call.

Then, the ACBE identifies a potential root cause, which could be that the bandwidth provided by cell is not sufficient to match the bandwidth requirement of the voice app, or an enterprise firewall filters out big packets of the voice app when end user uses a WiFi network at office. Sometime, the root cause might be complicated and related with multiple conditions. It is then not trivial to use rule based methods to identify the problem. One cell may e.g. be congested every five minutes because there is a subway station in the area of the cell covering. Since the ACBE has an internal historical database, it can use analytic methods like machine learning to adaptively generate decisions regarding preference of a voice app in specific cell at specific time.

The ACBE stores the result in the local database for future recommendations.

Figure 4:
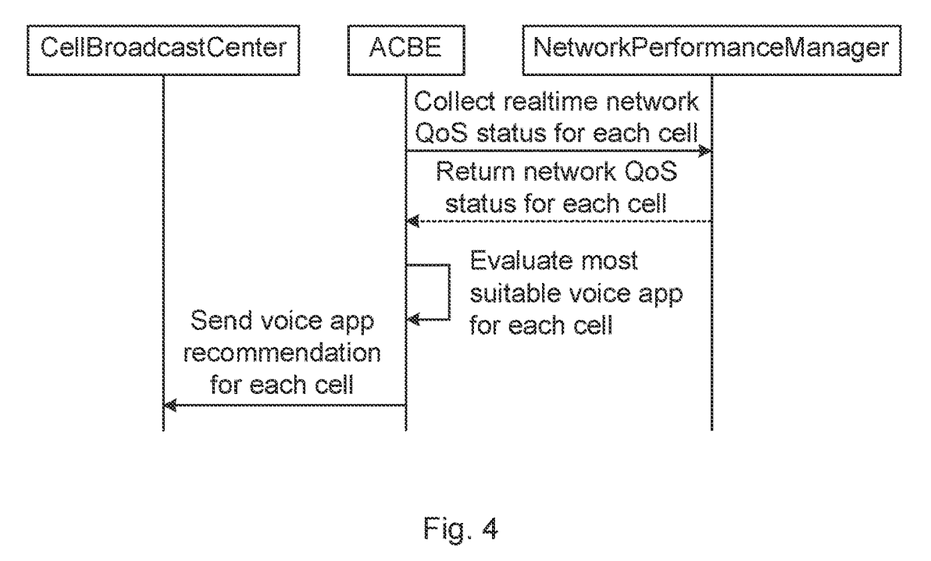
FIG. 4 is a schematic sequence chart illustrating an embodiment presented herein.

The procedure for real-time/current voice app list generation is illustrated in FIG. 4.

The ACBE continuously receives real-time network e.g. QoS status for each cell or coverage region from the network performance manager.

Based on the QoS status of each cell or coverage region, as well as result form the internal database, the ACBE generates lists of apps for each cell or coverage region. The lists may be listed in order of performance.

The ACBE then sends the list of each coverage region to a Cell Broadcast Center, which in turn sends messages to UEs within, or close to, the coverage region. If the messages are sent also to UEs close to the coverage region, the coverage region should be indicated in the message. In this way a UE entering such a coverage region can be prepared with a list of apps in order of performance directly when it enters the coverage region.

The role of Network Performance Manager 6 is to provide network performance information to the ACBE 5, both historical and current network performance information. The network performance information may e.g. be how much bandwidth or packet loss can be expected when using cellular network at a specific location at a current time. Besides network performance of cellar network, in another embodiment the Network Performance Manager 6 can also provide network performance information about local Wi-Fi networks, if the Wi-Fi networks can push network performance information to Network Performance Manager, preferably continuously push network performance information.

The network performance manager 6 may also provide analytic results in real time regarding UE usage behaviour of a specific voice application or other characteristics or the performance of this voice application.

The wireless communication network functions in a cellular network to deliver Cell Broadcast Message to UE in the following way.

A Base Station Controller (BSC) is in control of and supervises a number of Base Transceiver Stations (BTS). The BSC is responsible for the allocation of radio resources to a mobile call and for handovers that are made between base stations under its control. Other handovers are under control of a Mobile Switching Centre (MSC).

The BTS is a term used to denote a base station in GSM terminology. A BTS consists of an antenna and the radio equipment necessary to communicate by radio with a Mobile Station (MS). Each BTS covers a defined region, known as a cell. A BTS is under control of a BSC, which is in turn under control of a MSC.

A Cell Broadcast Center (CBC) is a network function in a cell broadcast system to send messages to radio systems in a cellular network, to distribute the cell broadcast messages.

The CBC is an entity within a mobile network to send Cell Broadcast messages (SMS-CB). The CBC receives messages to be broadcast from the information providers. At the CBC the messages can be modified, as well as control data such as a specified area or region, the transmission period and the transmission repetition frequency. The CBC sends the messages to the applicable BSC within the mobile network.

Cell Broadcast messages will be used to publish the lists to UEs within a coverage region. Cell Broadcast is a well-known technology to simultaneously deliver short messages to multiple users in a specified region. By using Cell Broadcast the following advantages are achieved:

- Cell Broadcast is not as affected by traffic congestion, therefore, it may be usable during a disaster when load spikes.
- Cell Broadcast can distribute a message to all UEs in the same radio cell, which compared to the case of unicasting the same message to many UEs, requires less bandwidth.
- Cell Broadcast distributes the same message to UEs in the same geographical area (the radio cell). This is very useful in certain cases, for example recommending all users in the same company office to use the same Voice App due to the fact that some enterprise firewall have down-prioritized other Voice applications.

Figure 5:
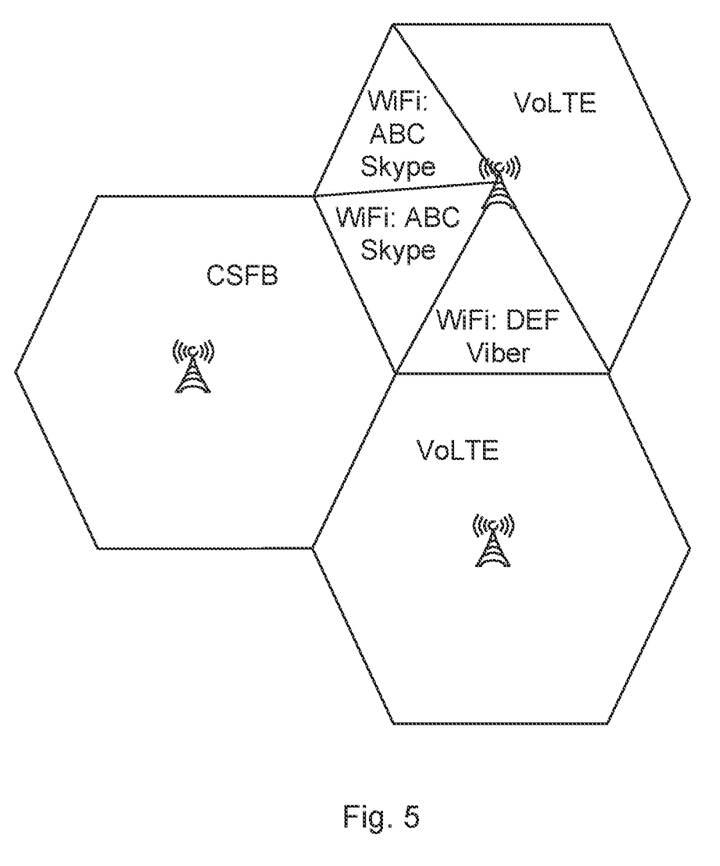
FIG. 5 is schematic illustration of coverage region presented herein.

FIG. 5 illustrates an example of how different coverage regions may be utilized. The text in each cell represents the recommended voice application from the system. In one cell VoLTE provides the best performance at this instance, and in another cell CSFB provides the best performance at this instance. Even in the same cell but different area thereof, there could be different voice application recommendations, in which case all the combination of preferred voice applications together with the area will be encoded in Cell Broadcast message received by UE in the cell. In the last cell, VoLTE provides the best performance in half the cell, in two sectors WiFi ABC provides the best performance for Skype, and in the last sector WiFi DEF provides the best performance for Viber. A UE can use a position functionality (such as GPS) to get its exact current location and match it to one of the recommended combinations to decide which voice application is preferred.

A cell broadcast message will in the example illustrated in FIG. 5 be different for different coverage regions. A list for the one cell is topped by VoLTE. A list for the another cell will be topped by CSFB. The last cell will for half the cell be topped by VoLTE, in two sectors be topped by Skype over WiFi ABC, and in the last sector be topped by Viber over WiFi DEF. Secondary applications in each respective list can be secondary in performance compared to the application top listed. The provided performance list of applications is advantageous, since different UEs may not be able to use the top listed application, or a user may not for some reason want to use the top listed application. Further, the list may instead be in the reverse, such that a user does not select an application e.g. blocked in a network.

A coverage region may e.g. be defined by a single cell, by more than one cell, or by part of a cell. A part of a cell may e.g. be defined by a particular angle from a base station, by an antenna beam, or a combination thereof. A coverage region may also be defined by geographical positions.

Figure 1:
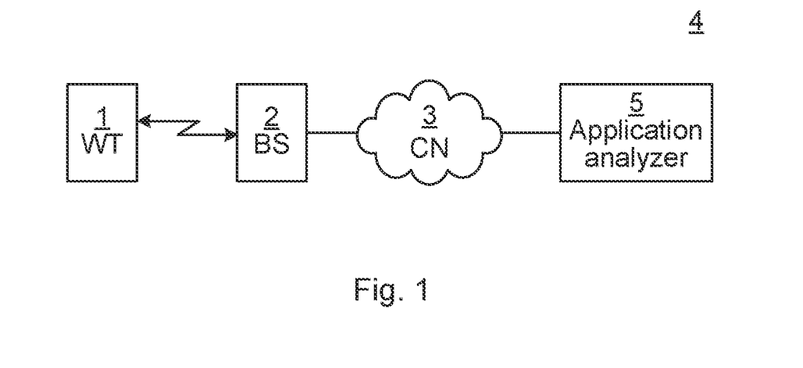
FIG. 1 is a schematic diagram illustrating an environment where embodiments presented herein can be applied.

A wireless communication network 4 is presented with reference to FIG. 1, wherein embodiments presented herein can be used. The wireless communication network 4 has a wireless terminal (WT) 1 in connectivity with a base station (BS) 2, in turn connected to a core network (CN) 3. An application analyser is 5 is also connected to the CN 3.

Figure 7A:
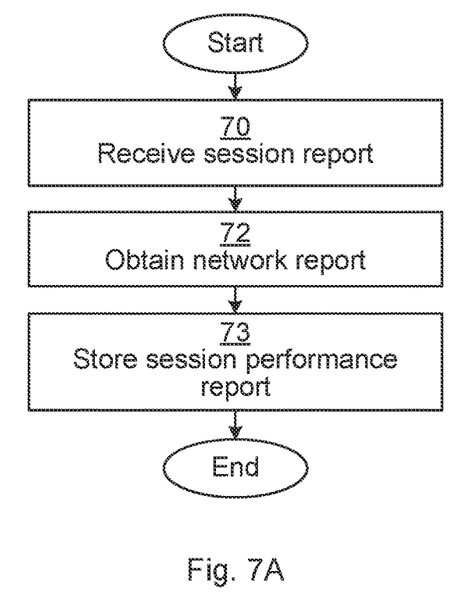
FIGS. 7A-7C are flow charts illustrating methods for embodiments presented herein.
Figure 7B:
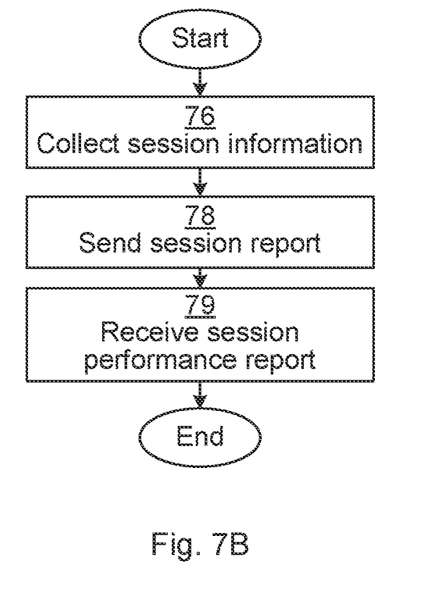
Figure 7C:
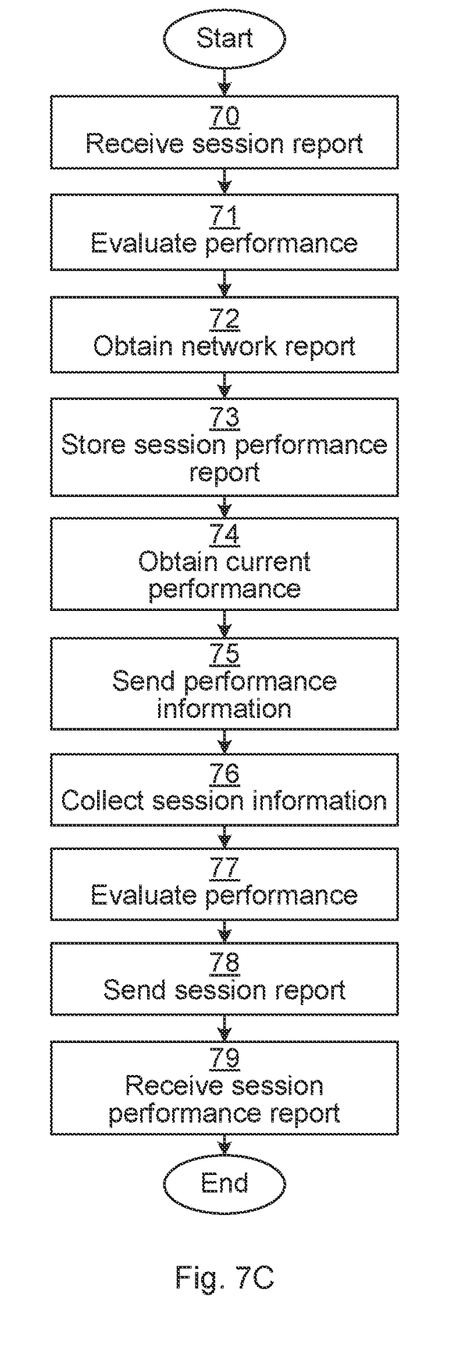

A method, according to an embodiment, for session analysis in a wireless communication network is presented with reference to FIGS. 7A and 7C. The method is performed in a network node 5 of the wireless communication network 4 and comprises receiving 70 a session report from a wireless terminal 1, the wireless terminal being within a coverage region of the wireless communication network, obtaining 72 a network report associated with the session report, and storing 73 a session network report associated with performance of the obtained network report and performance of the received the session report, for the coverage region.

The method may further comprise evaluating 71 performance of the received session report, and obtaining 72 the network report only when the performance of the received session report is determined to be below a threshold.

The method may further comprise providing 75 performance information associated with the session network report to wireless terminals, via a cell broadcast message, for the coverage region. The method may further comprise obtaining 74 a current network report for the coverage region.

The session report may comprise performance information for an application of the wireless terminal.

The session report may be associated with a call session.

The evaluation 71 may be based on one or more of latency, bandwidth, QoS and firewall action.

The coverage region may be a region associated with one or more of cell, wifi, base station, antenna, geographical area.

The cell broadcast message may comprise a list of applications, and the applications may be listed in a performance order.

The cell broadcast message may comprise a list of type of network, and the types of network may be listed in performance order.

The performance information may be associated with the session network report is associated with a time frame.

A method, according to an embodiment, for session analysis in a wireless communication network is presented with reference to FIGS. 7B and 7C. The method is performed in a wireless terminal 1 of the wireless communication network 4 and comprises collecting 76 session information associated with an application of the wireless terminal, for a coverage region of the wireless communication network, sending 78 a session report associated with performance of the collected session information to a network node 5, and receiving 79 performance information associated with a session network report for the coverage region from the network node via a cell broadcast message.

The method may further comprise evaluating 77 performance of the collected session information and providing a session report based on the evaluation.

The evaluation 77 in the wireless terminal may be based on one or more of the following: network quality information, application specific session information, geographical location information, and time information of the session.

Figure 6A:
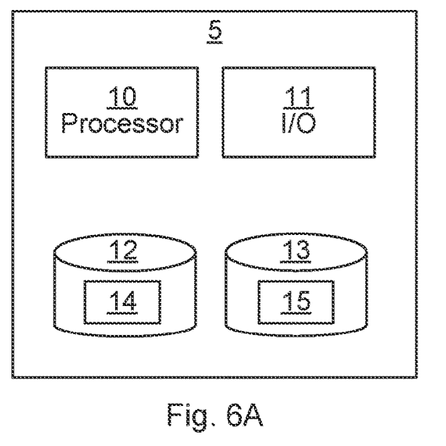
FIGS. 6A-6B are schematic diagrams illustrating some components of a network node and a wireless terminal.

A network node, according to an embodiment, for session analysis in a wireless communication network 4 is presented with reference to FIG. 6A. The network node 5 comprises a processor 10 and a computer program product 12, 13. The computer program product stores instructions that, when executed by the processor, causes the network node to receive 70 a session report from a wireless terminal 1, the wireless terminal being within a coverage region of the wireless communication network, to obtain 72 a network report associated with the session report, and to store 73 a session network report associated with performance of the obtained network report and performance of the received the session report, for the coverage region.

The network node may further be caused to evaluate 71 performance of the received session report, and to obtaining 72 the network report only when the performance of the received session report is determined to be below a threshold.

The network node may further be caused to provide 75 performance information associated with the session network report to wireless terminals, via a cell broadcast message, for the coverage region. The network node may further be caused to obtain 74 a current network report for the coverage region.

Figure 6B:
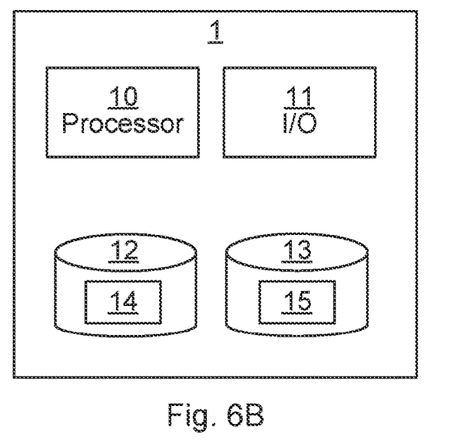

A wireless terminal, according to an embodiment, for session analysis in a wireless communication network 4 is presented with reference to FIG. 6B. The wireless terminal 1 comprises a processor 10 and a computer program product 12, 13. The computer program product stores instructions that, when executed by the processor, causes the wireless terminal to collect 76 session information associated with an application of the wireless terminal, for a coverage region of the wireless communication network, to send 78 a session report associated with performance of the collected session information to a network node 5, and to receive 79 performance information associated with a session network report for the coverage region from the network node via a cell broadcast message.

The wireless terminal may further be cause to evaluate 77 performance of the collected session information and providing a session report based on the evaluation.

Figure 8A:
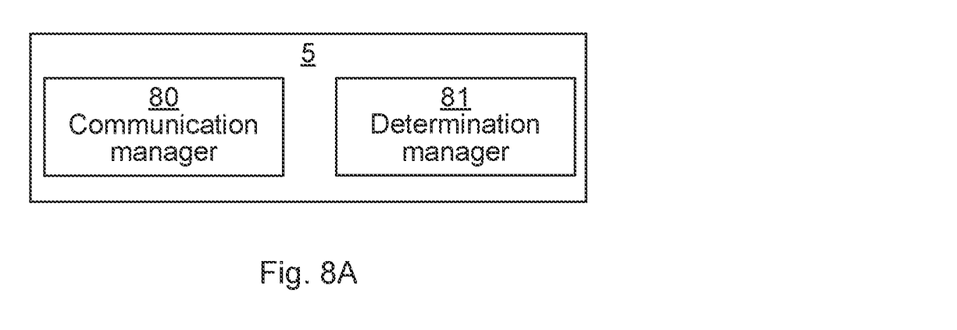
FIGS. 8A-8B are schematic diagrams showing functional modules of a network node and a wireless device.

A network node, according to an embodiment, for session analysis in a wireless communication network 4 is presented with reference to FIG. 8A. The network node 5 comprises a communication manager 80. The communication manager 80 is for receiving 70 a session report from a wireless terminal 1, the wireless terminal being within a coverage region of the wireless communication network, for obtaining 72 a network report associated with the session report, and for storing 73 a session network report associated with performance of the obtained network report and performance of the received the session report, for the coverage region.

Figure 8B:
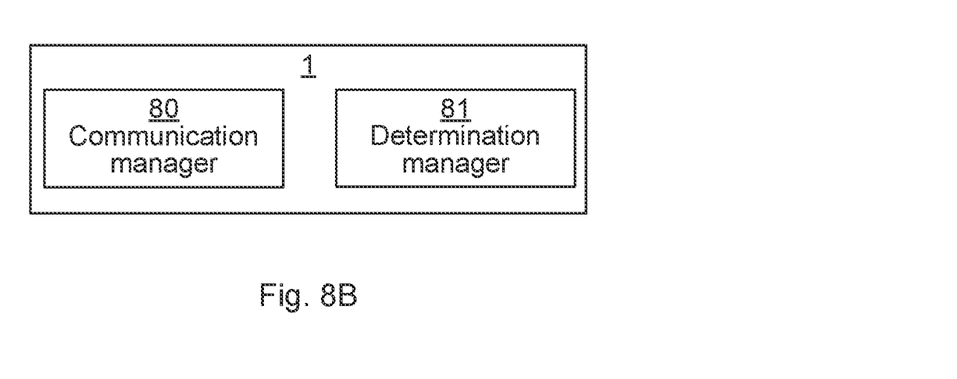

A wireless terminal, according to an embodiment, for session analysis in a wireless communication network 4 is presented with reference to FIG. 8B. The wireless terminal 1 comprises a communication manager 80. The communication manager 80 is for collecting 76 session information associated with an application of the wireless terminal, for a coverage region of the wireless communication network, for sending 78 a session report associated with performance of the collected session information to a network node 5 and for receiving 79 performance information associated with a session network report for the coverage region from the network node via a cell broadcast message.

A computer program, according to an embodiment, for session analysis in a wireless communication network 4 is presented. The computer program comprises computer program code which, when run on a network node 5 in the wireless communication network, causes the network node to receive 70 a session report from a wireless terminal 1, the wireless terminal being within a coverage region of the wireless communication network, to obtain 72 a network report associated with the session report, and to store 73 a session network report associated with performance of the obtained network report and performance of the received the session report, for the coverage region.

A computer program, according to an embodiment, for session analysis in a wireless communication network 4 is presented. The computer program comprises computer program code which, when run on a wireless terminal 1 in the wireless communication network, causes the wireless terminal to collect 76 session information associated with an application of the wireless terminal, for a coverage region of the wireless communication network, to send 78 a session report associated with performance of the collected session information to a network node 5, and to receive 79 performance information associated with a session network report for the coverage region from the network node via a cell broadcast message.

A computer program product 12, 13, comprising a computer program 14, 15 and a computer readable storage means on which the computer program 14, 15 is stored is also presented.

FIG. 6A is a schematic diagram showing some components of the network node 5. A processor 10 may be provided using any combination of one or more of a suitable central processing unit, CPU, multiprocessor, microcontroller, digital signal processor, DSP, application specific integrated circuit etc., capable of executing software instructions of a computer program 14 stored in a memory. The memory can thus be considered to be or form part of the computer program product 12. The processor 10 may be configured to execute methods described herein with reference to FIGS. 7A and 7C.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of software instructions in the processor 10. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 15, to improve functionality for the network node 5.

The network node 5 may further comprise an input/output, I/O, interface 11 including e.g. a user interface. The network node may further comprise a receiver configured to receive signalling from other nodes, and a transmitter configured to transmit signalling to other nodes (not illustrated). Other components of the network node are omitted in order not to obscure the concepts presented herein.

FIG. 8A is a schematic diagram showing functional blocks of the network node 5. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIGS. 7A and 7C, comprising a communication manager unit 80 and a determination manager unit 81. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The communication manger 80 is for session analysis in a wireless communication network. This module corresponds to the receive step 70, the obtain step 72, and the store step 73 of FIGS. 7A and 7C, the obtain step 74, and the send step 75 of FIG. 7C. This module can e.g. be implemented by the processor 10 of FIG. 6A, when running the computer program.

The determination manger 81 is for session analysis in a wireless communication network. This module corresponds to the evaluate step 71 of FIG. 7C. This module can e.g. be implemented by the processor 10 of FIG. 6A, when running the computer program.

FIG. 6B is a schematic diagram showing some components of the wireless terminal 1. A processor 10 may be provided using any combination of one or more of a suitable central processing unit, CPU, multiprocessor, microcontroller, digital signal processor, DSP, application specific integrated circuit etc., capable of executing software instructions of a computer program 14 stored in a memory. The memory can thus be considered to be or form part of the computer program product 12. The processor 10 may be configured to execute methods described herein with reference to FIGS. 7B and 7C.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of software instructions in the processor 10. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 15, to improve functionality for the wireless terminal 1.

The wireless terminal 1 may further comprise an input/output, I/O, interface 11 including e.g. a user interface. The network node may further comprise a receiver configured to receive signalling from other nodes, and a transmitter configured to transmit signalling to other nodes (not illustrated). Other components of the network node are omitted in order not to obscure the concepts presented herein.

FIG. 8B is a schematic diagram showing functional blocks of the wireless terminal 1. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIGS. 7B and 7C, comprising a communication manager unit 80 and a determination manager unit 81. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The communication manger 80 is for session analysis in a wireless communication network. This module corresponds to the collect step 76, the send step 78, and the receive step 79 of FIGS. 7B and 7C. This module can e.g. be implemented by the processor 10 of FIG. 6B, when running the computer program.

The determination manger 81 is for session analysis in a wireless communication network. This module corresponds to the evaluate step 77 of FIG. 7C. This module can e.g. be implemented by the processor 10 of FIG. 6B, when running the computer program.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for session analysis in a wireless communication network, the method comprising a wireless terminal of the wireless communication network:
   collecting session information associated with an application of the wireless terminal, for a coverage region of the wireless communication network;
   sending a session report associated with performance of the collected session information to a network node; and
   receiving performance information associated with a session network report for the coverage region from the network node via a cell broadcast message, wherein the cell broadcast message comprises a list of applications.

2. The method of claim 1, further comprising evaluating performance of the collected session information and providing a session report based on the evaluation.

3. The method of claim 1, wherein the performance information is associated with current network performance for the coverage region.

4. The method of claim 1, wherein the session report is associated with a call session.

5. The method of claim 4, wherein the evaluation in the wireless terminal is based on: network quality information, application specific session information, geographical location information, and/or time information of the session.

6. The method of claim 1, wherein the coverage region is a region associated with: cell, wifi, base station, antenna, and/or geographical area.

7. The method of claim 1, wherein the applications are listed in a performance order.

8. The method of claim 1, wherein the performance information is associated with a time frame.

9. A wireless terminal for session analysis in a wireless communication network, the wireless terminal comprising:
   processing circuitry; and
   memory containing instructions executable by the processing circuitry whereby the wireless terminal is configured to:
      collect session information associated with an application of the wireless terminal, for a coverage region of the wireless communication network;
      send a session report associated with performance of the collected session information to a network node; and
      receive performance information associated with a session network report for the coverage region from the network node via a cell broadcast message, wherein the cell broadcast message comprises a list of applications listed in a performance order.

10. The wireless terminal of claim 9, wherein the processing circuitry is further configured to evaluate the performance of the collected session information and provide a session report based on the evaluation.

11. The wireless terminal of claim 9, wherein the performance information is associated with current network performance for the coverage region.

12. The wireless terminal of claim 9, wherein the session report is associated with a call session.

13. The wireless terminal of claim 12, wherein the evaluation in the wireless terminal is based on: network quality information, application specific session information, geographical location information, and/or time information of the session.

14. The wireless terminal of claim 9, wherein the coverage region is a region associated with: cell, wifi, base station, antenna, and/or geographical area.

15. The wireless terminal of claim 9, wherein the performance information is associated with a time frame.

16. A non-transitory computer readable medium storing thereon a computer program product for session analysis in a wireless communication network that, when executed by processing circuitry of a wireless terminal, configures the wireless terminal to:
  collect session information associated with an application of the wireless terminal, for a coverage region of the wireless communication network;
  send a session report associated with performance of the collected session information to a network node; and
  receive performance information associated with a session network report for the coverage region from the network node via a cell broadcast message, wherein the cell broadcast message comprises a list of applications listed in a performance order.

\* \* \* \* \*